United States Patent [19]
Koslov et al.

[11] Patent Number: 5,783,974
[45] Date of Patent: Jul. 21, 1998

[54] DIGITAL INTERPOLATION UP SAMPLING CIRCUIT AND DIGITAL MODULATOR USING SAME

[75] Inventors: Joshua L. Koslov, Hopewell; Frank A. Lane, Medford Lakes; Carl G. Scarpa, Plainsboro, all of N.J.

[73] Assignee: Hitachi America, Ltd., Tarrytown, N.Y.

[21] Appl. No.: 789,439

[22] Filed: Jan. 27, 1997

[51] Int. Cl.$^6$ .............................. H04L 27/20; H04L 27/36
[52] U.S. Cl. ........................ 332/103; 332/149; 375/261; 375/268; 375/298; 375/300; 364/724.13
[58] Field of Search ............................ 332/103, 104, 332/105, 149; 375/261, 268, 298, 300; 364/724.13

[56] References Cited

U.S. PATENT DOCUMENTS

5,412,352  5/1995  Graham .
5,534,828  7/1996  Okada et al. ..................... 332/103

Primary Examiner—Siegfried H. Grimm
Attorney, Agent, or Firm—Michaelson & Wallace; Michael P. Straub; Peter L. Michaelson

[57] ABSTRACT

Methods and apparatus for converting a relatively low frequency signal, e.g., a 1.5 MHz signal, to a high frequency signal, e.g., a 30–100 MHz signal, in the digital domain. An interpolation technique is used to convert the low rate digital signal to a high rate signal and to shift the carrier to a desired frequency. This is accomplished, by first positioning the information signal, e.g., the digital wave form to be modulated on a carrier at a relatively low rate using a digital mixer operating at a fraction of the ultimate digital to analog conversion frequency. The relatively low rate signal generated by the mixing operation is then converted to a high rate signal by one or more interpolation stages. An adjustable passband filter circuit is included in each interpolation stage for selectively filtering out the signal or images created as a result of a signal padding operation performed as part of each interpolation stage. The interpolator of the present invention can be used in a modulator to translate the output of the mixer to the modulator's ultimate carrier frequency.

23 Claims, 7 Drawing Sheets

DIGITAL INTERPOLATION UP SAMPLING CIRCUIT AND DIGITAL MODULATOR USING SAME

FIELD OF THE INVENTION

The present invention is directed to configurable filters and, more particularly, to methods and apparatus for implementing and controlling digital filters suitable for use in modulators.

BACKGROUND OF THE INVENTION

The use of digital signals for the transmission of various types of information continues to grow in importance.

Figure 1:
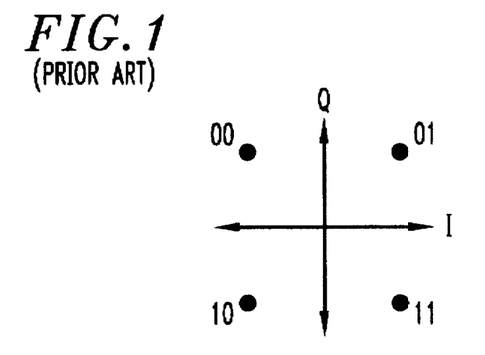
FIG. 1 is a diagram illustrating the four possible amplitude and phase values of a QPSK signal.

Digital modulation involves the mapping of bits into symbols, filtering the symbols into desired pulse shapes, and the translation of the baseband pulses onto a carrier signal for transmission. The mapping of bits into symbols involves, e.g., collecting N bits and mapping those bits into 1 of $2^N$ signal amplitude and phase values. As an example, consider QPSK (Quadrature Phase Shift Keying) which maps 2 bits into 1 of 4 amplitude and phase values as illustrated in FIG. 1.

Figure 2:
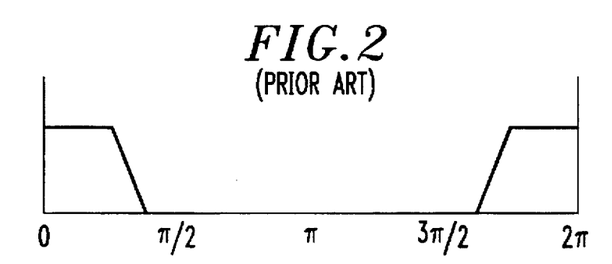
FIG. 2 is a diagram illustrating the frequency response of a known 4x low pass pulse shaping filter.

Pulse shaping is used to limit the bandwidth of the transmitted signal to the desired channel bandwidth. It can be accomplished by a digital filtering operation and is often implemented as an FIR (finite impulse response filter). Because the channel bandwidth must be wider than the symbol transmission rate, the rate at which the pulse shaping filter operates must be greater than the symbol rate. Generally, it must be at least twice the channel bandwidth but is often greater than that so as to be an integer multiple of the symbol rate, for example 2x or 4x the symbol rate. The normalized frequency characteristics for a representative 4x low pass pulse shaping filter is illustrated in FIG. 2.

In various known modulators, the translation to a carrier frequency is often carried out after the signal is converted from a digital to an analog signal. In such embodiments, a mixing operation is performed in the analog domain to convert the information signal up to the carrier frequency.

Such known systems have the disadvantage of requiring analog mixers along with other associated analog circuitry. In view of the high degree of reliability of digital integrated circuits as compared to analog system components, there are advantages in moving to a design implemented using all or almost all digital as opposed to analog circuitry.

Figure 3:
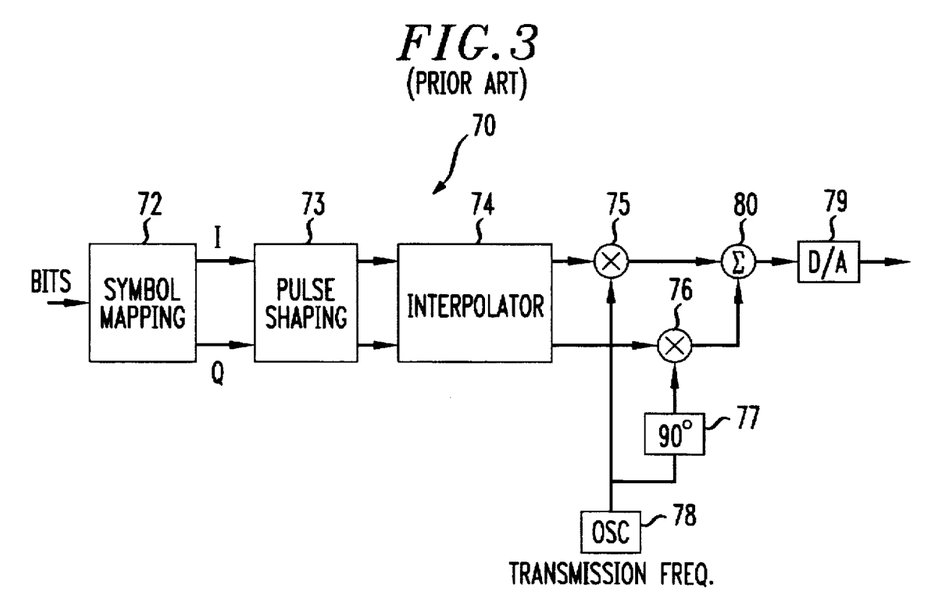
FIG. 3 illustrates a known modulator.

One particular known modulator which is described in U.S. Pat. No. 5,412,352 is illustrated in FIG. 3. The modulator of FIG. 3 requires a single frequency translation from a digital baseband signal to a selected carrier frequency. This frequency translation is performed in the digital domain.

The modulator of FIG. 3 includes a symbol mapping circuit 72, a pulse shaping circuit 73, an interpolator 74, first and second mixers 75, 76 for mixing the digital I and Q signals output by the interpolator 74, an oscillator 78, a phase shifter 77, a summer 80, and a D/A converter 79. The oscillator 78 and mixers 75, 76 are located after the interpolator 74.

In the known modulator 70, in order to create a digital signal at the relatively high frequency of the carrier signal, e.g., 5–40 MHz, an interpolator 74 is placed between the output of the pulse shaping circuit 73 and the mixers 75, 76.

Unfortunately, each of the known systems suffers from the disadvantage of either performing a mixing operation to the carrier frequency in the analog domain or, as in the case of the modulator illustrated in FIG. 3, having to provide digital mixers 75, 76 capable of operating at the ultimate sampling frequency. Because of the relatively high carrier frequency, e.g., 40 MHz, the cost of implementing such mixers 75, 76 can be prohibitive in certain applications. This is due in large part to the cost of high speed multipliers needed to implement the mixers 75, 76.

Accordingly, there is a need for a digital modulator capable of mixing a signal to a carrier frequency in the digital domain that can be implemented at a reasonable cost. Furthermore, there is a need for methods and apparatus for implementing and controlling, at a reasonable cost, digital filters used to implement a digital modulator.

SUMMARY OF THE PRESENT INVENTION

The present invention relates to methods and apparatus for directly synthesizing a signal, e.g., a digital signal, on a carrier signal. Various embodiments of the present invention are directed to configurable filter implementations and to methods of controlling configurable filters as part of a modulator which employs configurable filters in one or more upsampling stages.

The present invention can be used for modulating signals which can be represented by an amplitude, or by in-phase and quadrature amplitudes, including, e.g., AM (amplitude modulation), VSB (vestigial sideband), SSB (single side band), QPSK (quadrature phase shift keying), QAM (quadrature amplitude modulation), or digital (e.g., multilevel) VSB. For purposes of an exemplary embodiment, the present invention will be described, where the signal type is relevant, in terms of a QPSK modulator. However, it is to be understood that the present invention is in no way limited to a QPSK embodiment.

The in-phase and/or quadrature amplitudes of a signal may represent, e.g., levels indicative of symbols in a digital information transmission system.

In accordance with the present invention, an interpolation technique is used to convert a low rate signal, e.g., a digital signal, to a high rate signal and to shift the carrier to a desired frequency. This is accomplished, in accordance with the present invention, by positioning the information signal, e.g., the digital waveform to be modulated, on a carrier at a relatively low rate. This is accomplished by performing a digital mixing operation. The relatively low rate signal generated by the mixing operation is then converted to a high rate signal by a cascade of interpolator stages.

In one embodiment, a passband filter, e.g., a configurable filter, is included in each interpolation stage. The passband filter of each stage is controlled so that it is configured to have one of several possible transfer functions. Each one of the possible transfer functions has a passband in a different part of the digital spectrum. The choice of filter configurations through one or more stages is used to result in the shifting of the carrier from a frequency in the nyquist bandwidth of the low rate signal to virtually any frequency in the nyquist bandwidth of the final output, e.g., transmission rate. By using the interpolator circuitry of the present invention to perform the frequency shifting operation, an information signal can be shifted to a high carrier frequency in the digital domain. Significantly, this is done without the need for a digital mixer that operates at the high carrier frequency.

In accordance with one embodiment of the present invention, the configuration of a filter is effectively selected by shifting the input signal at the input to the passband filter and then frequency shifting the filter output signal in the opposite direction. As a result of the frequency shifting operations performed before and after the passband filtering operation, the result is effectively the same as if the filter passband had been changed and the signal being filtered had not been shifted. This frequency shifting technique at the input and output of each filter, is applied, in accordance with one embodiment of the present invention to control a plurality of filters cascaded together as part of a plurality of interpolation stages.

While the signal frequency shifting technique of the present invention requires frequency shifting circuitry at the inputs and outputs of passband filters to effectively create a configurable passband filter circuit, this approach may, e.g., in the case of multi-tap filters, be more cost effective to implement than systems which shift the center frequency of a filter's passband, e.g., by changing filter coefficient vales, to achieve a desired filter transfer function.

Relatively simple, and thus relatively inexpensive, frequency shifting circuits suitable for use in accordance with the present invention are described in the detailed description that follows.

In addition to the various configurable filter designs of the present invention, the present invention is also directed to methods and apparatus that are suitable for controlling configurable filters, e.g., used in an interpolator of a modulator.

In one particular embodiment a multi-bit binary control word is used to specify a desired ultimate output frequency. A limited number of bits, e.g., a preselected three bits of the control word, are then used to generate a control signal used to control the configuration of a filter at one stage of a multi-stage interpolator as required to achieve the carrier output frequency specified by the control word. A different set of 3 bits may be used to control each of the filters. A portion of the control word may also be used to control an oscillator used to mix the signal supplied to the input of the interpolation circuit of the present invention.

While the use of the various methods and apparatus of the present invention are described in the context of a digital pulse modulator, the methods and apparatus of the present invention are applicable to a wide variety of applications where it is desirable or necessary to use or control configurable digital filters.

As a result of the present invention it is possible to provide a less costly and easier to implement modulator than the prior art digital designs, while maintaining the advantages of performing the modulation operations in the digital domain.

Many other features and embodiments of the present invention are described in detail below.

DETAILED DESCRIPTION

The present invention relates to methods and apparatus for directly synthesizing a signal, e.g., a digital signal, on a carrier signal. As discussed above, the present invention can be used for modulating any signal which can be represented by an amplitude or by in-phase and quadrature phase amplitudes.

Figure 4:
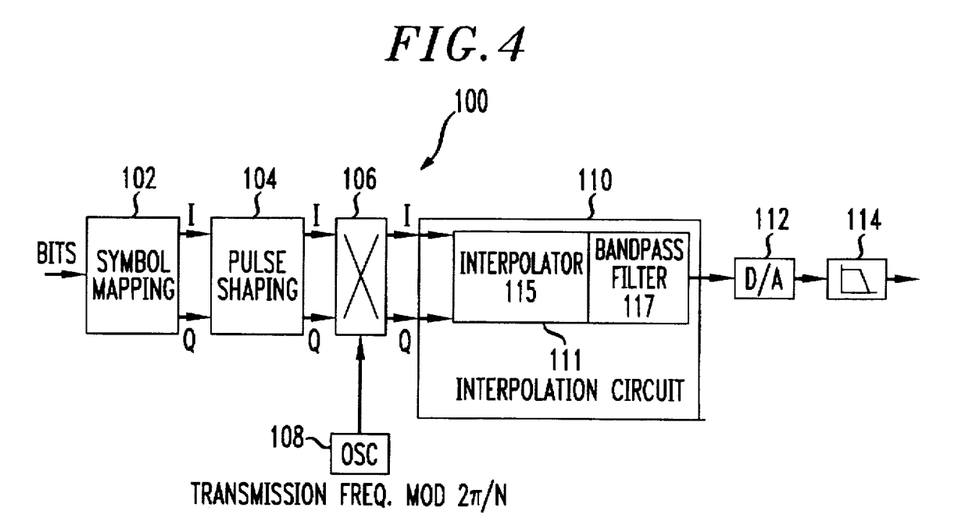
FIG. 4 illustrates a digital modulator implemented in accordance with the present invention.

Referring now to FIG. 4, there is illustrated a modulator 100 implemented in accordance with one embodiment of the present invention. The modulator 100 includes a symbol mapping circuit 102, a complex pulse shaping circuit 104, a complex mixer 106, an oscillator 108, an interpolation circuit 110, a D/A converter 112, and a low pass filter 114. The oscillator 108 may be, e.g., a numerically controlled oscillator which can be controlled via a control signal supplied thereto. The interpolation circuit 110 includes one or more stages 111, each stage including an interpolator 115, and a bandpass filter 117. While the interpolator 115 and bandpass filter 117 are illustrated as complex circuits, e.g., which process both real and imaginary signals, the use of complex circuits is not mandatory. In addition, it is possible to supply only the real output of the interpolation circuit 110 to the D/A converter if the quadrature phase signal is not required.

In accordance with the present invention, the information signal, e.g., digital bits of data, are supplied to the input of the symbol mapping circuit 102. The symbol mapping circuit 102 outputs in-phase (I) and quadrature (Q) phase signals which are supplied to corresponding inputs of the complex pulse shaping circuit 104. The I and Q outputs of the pulse shaping circuit 104 are supplied to corresponding I and Q inputs of the mixer 106.

In the embodiment illustrated in FIG. 4, the signal output by the oscillator 108 has a frequency which is equal to the transmission, i.e., ultimate carrier frequency, modulo the oscillator sampling rate. The complex mixer 106 mixes the output of the oscillator 108 with the I and Q signals output by the pulse shaping circuit 104. I and Q signals at the output frequency of the oscillator 108 are supplied to corresponding I and Q inputs of the interpolation circuit 110. The operation of the interpolator circuit 110 of the present invention will be described in greater detail below.

While, in the FIG. 4 embodiment, the input to the interpolation circuit is generated using digital circuitry, e.g., a digital mixer 106, the input signal could be generated using analog circuitry and then converted into a digital signal, e.g., just prior to the input to the novel interpolation circuit 110 of the present invention.

The output of the interpolation circuit 110 is a signal which has been shifted in frequency, in accordance with the present invention, from the relatively low output frequency of the oscillator 108 up to the final transmission frequency. In the illustrated embodiment, the output, e.g., the real portion of a complex output signal, of the interpolation circuit 110 is supplied to the input of the D/A converter 112. After being converted into an analog signal, the signal to be transmitted is lowpass filtered by the low pass filter 114 and then output for transmission purposes.

A simple form of interpolation by integer ratios can be used to implement the interpolator 115 of the interpolation circuit 110. This form of interpolation involves inserting zeros in between the output samples of the pulse shaping filter 104 and then filtering the padded signal. An artifact of the zero padding operation is the creation of signal images in the upsampled domain at intervals in digital frequency of $\pm 2\pi/N$, where N is an integer corresponding to the interpolation ratio.

Figure 5:
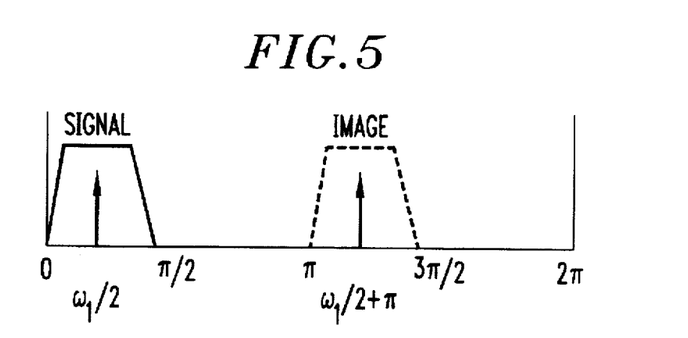
FIG. 5 illustrates the frequency response of a switch band interpolator circuit of the present invention.

In such an embodiment, if a signal is located at the frequency $\omega_1$ and zero padded for an interpolation by N=2, the signal will be located in the interpolated, i.e., upsampled, domain at $\omega_1/2$ and an image will appear at $\omega_1/2+\pi$. In accordance with the present invention, by using a bandpass filter 117 that selects the image rather than the original signal, the signal can be shifted by $\pi$ radians in the interpolated domain. Referring now to FIG. 5, the dotted line beneath the word image represents the use of a bandpass filter 117 to select the image in the interpolated domain and thereby achieve a shift in frequency.

In this manner, the interpolation circuit 110, can be used to place a signal on a carrier in the interpolated domain without the need to perform a mixing operation after the interpolation step is performed. Thus, the interpolation circuit 110 may be referred to as a band shifting interpolator because it achieves a shift in the carrier frequency. In such an embodiment, the output carrier is a function of the input carrier and the selected band of the interpolator, i.e., $$\omega_{out}=\omega_{in}/N+2\pi m/N,$$

where 0<m<N and, where m and N are integers.

Thus, in accordance with the present invention, a mixer 106 can be positioned after the pulse shaping filter 104 and ahead of the interpolation circuit 110 to precisely control the output carrier frequency. The modulator 100 of the present invention has the advantage of operating the multipliers needed to implement the mixer 106 at 1/Nth the output frequency. This is in sharp contrast to known modulators which require a mixer to compute the output at the full clock rate of the final carrier signal.

In order for an interpolation circuit 110 having an interpolation ratio of N to be able to independently select any of the signal images, N different bandpass filters would be required. In such an embodiment one of the N filters would be selected for use as the filter 117 at any given time. For large values of N, this can become quite burdensome.

One embodiment of the present invention is directed to a method of achieving large interpolation ratios by using a series of cascaded interpolation circuits as opposed to a single interpolation circuit. When using a series of interpolation stages, the ultimate interpolation ratio is the product of the ratios of the cascaded stages. Accordingly, it is possible to obtain a large interpolation value by using a series of interpolation circuits each of which has a relatively low interpolation value.

Figure 6:
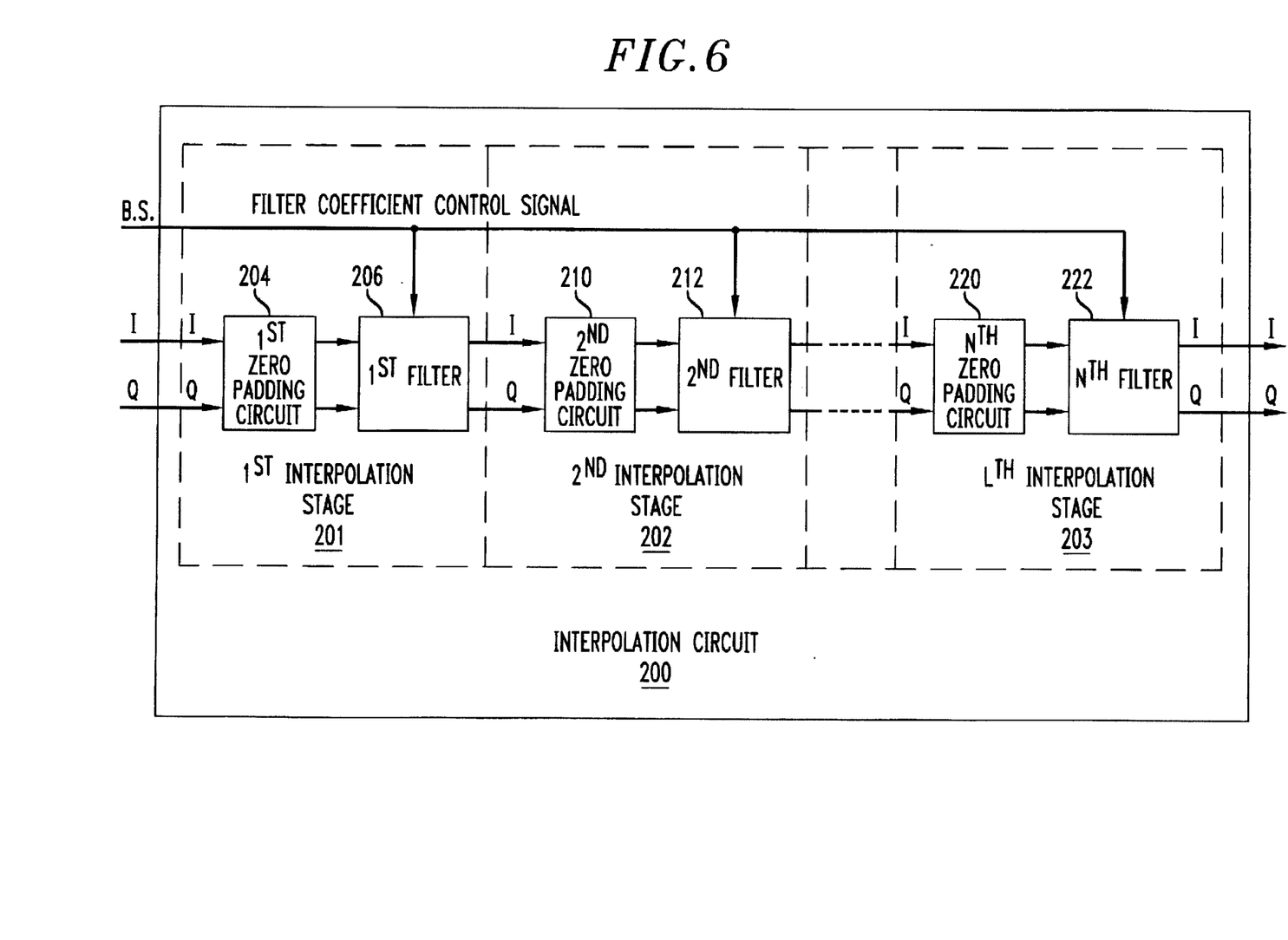
FIG. 6 illustrates an interpolation circuit of the present invention implemented as a series of cascaded interpolation stages.

Referring now to FIG. 6, there is illustrated an interpolation circuit 200 which is implemented as a series of L interpolation circuits or stages $S_0$ 201, $S_1$ 202, $S_{L-1}$ 203. Each of the first through $L^{th}$ interpolation stages comprises a zero padding circuit 204, 210, 220 and a passband filter 206, 212, 222. The $L^{th}$ interpolation stage 203 has its I and Q outputs coupled to a summer 223 which comprises an output circuit 207. The output of the summer 223 serves as the output of the interpolation circuit 200.

In the FIG. 6 embodiment, the ultimate interpolation value N is the product of the ratios of the L cascaded stages. If N is selected to be a power of 2 then it can be realized by cascading L 2x interpolation stages such that $N=2^L$. The interpolation circuit 200 can, in accordance with the present invention, be used to translate the signal output by the mixer 106 up to the output carrier frequency.

Figure 7:
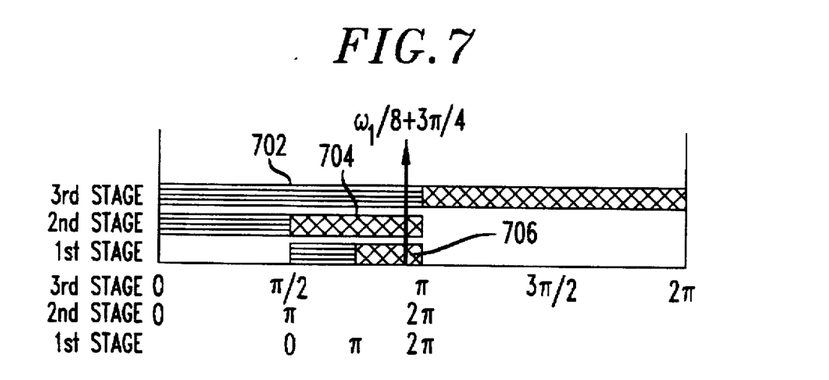
FIG. 7 illustrates the frequency band selection for a cascaded 8x interpolator used in accordance with one embodiment of the present invention.

In an embodiment of cascaded 2x interpolators, either the signal or its image is selected by using the filter 206, 212, 222 of each stage 201, 202, 203. In the case of 2x interpolation stages, the signal will be located in the upsampled frequency range of 0 to $\pi$ while the image will be located in the range of $\pi$ to $2\pi$. The determination of which frequency band, e.g., the signal or the image, is to be used at each stage 201, 202, 203 is determined by mapping the output carrier signal back through each interpolation stage. As shown in FIG. 7, which is an illustration of normalized frequency vs. signal amplitude, the output carrier is mapped to $\omega_{in}/8+3\pi/4$ for an 8x interpolation accomplished using three 2x stages. This is done by selecting the lower frequency band 702, e.g., the signal in the upsampled domain of the last stage, e.g., stage 203 and the upper frequency band 704, 706, e.g., the signal image in the upsampled domain of the first two stages, e.g., stages 201, 202. The selection process is achieved using the passband filter 206, 212, 222 included in each one of the three stages 201, 202, 203.

For purposes of design simplicity, it is desirable that all of the zero padding circuits 204, 210, 220 and filters 206, 212, 222 be of the same general hardware design. In accordance with the present invention, by changing coefficient filter values from filter to filter, a single filter design can be used for all of the filters 206, 212, 222. Changes in the filter coefficient values are used to achieve the necessary transfer function for any given filter 206, 212, 222.

Thus, the interpolation circuit 200 may be implemented using a series of virtually identical interpolation stages, each interpolation stage including, e.g., an identical zero padding circuit and a passband filter. One or more filter configuration control signals, e.g., filter band select (BS) signals, are supplied to each of the filter circuits 206, 212, 222 to control each individual filter's transfer function, e.g., by altering filter coefficient values.

The filter structure of a filter suitable for use as the filters 206, 212, 222 in an embodiment which uses 2x interpolation stages will now be discussed.

The interpolator filter for a 2x interpolator should have the characteristic of passing the signal at $\omega_{in}/2$ and stopping its image at $\omega_{in}/2+\pi$, or the exact opposite if the image is to be selected. If $\omega_{in}$ can range from [0, 2$\pi$], then it is very difficult to design a single filter that can cover the entire range of the desired signal and stop the image as well. If the interpolated band is divided up into quarters, it is much easier to design a filter which can pass one quarter of the band and stop one quarter of the band $\pi$ radians away.

Figure 8:
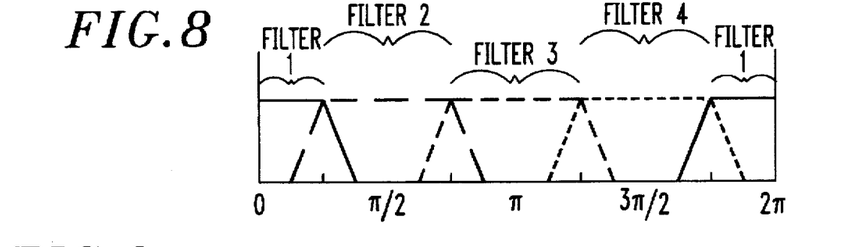
FIG. 8 illustrates the frequency response of quarter band filters used in one embodiment of the present invention.

A quarter band filter having a pass band of 0 to $\pi/4$ and $7\pi/4$ to $2\pi$, and a stop band of $3\pi/4$ to $5\pi/4$ makes a suitable interpolation filter for a signal with $\omega_{in}$ in the range of $3\pi/2$ to $2\pi$ since $\omega_{out}=\omega_{in}/2$ after 2x interpolation. By shifting such a filter in frequency so that it is centered on 0, π/2, π, and 3π/2 then this single filter design can be used to completely cover the interpolated spectrum. FIG. 8 shows the passbands for four quarter-band filters, i.e., Filter 1, Filter 2, Filter 3, and Filter 4 which are centered at 0, π/2, π, and 3π/2, respectively. The passband for each of the four filters is represented using lines with differing amounts of discontinuities. The pass band of Filter 1 is represented using solid lines while the passband of Filter 4 is represented using lines with the greatest number of discontinuities.

Each quarter-band filter, Filter 1, Filter 2, Filter 3, Filter 4, has a relatively wide transition skirt corresponding to relatively few taps. Because each filter has a flat passband, a signal can be placed in any of the quarter bands without linear distortion and with very low crosstalk into the filter pi radians away. This effectively reduces or eliminates aliasing in the upconversion process.

The first of the four low pass filters having the frequency characteristics illustrated in FIG. 8, e.g., Filter 1, can be implemented with real valued coefficients. The shifted filters, e.g., Filters 2, 3, and 4, can be implemented using the same general hardware as Filter 1, but different filter coefficients. The filter coefficients for Filters 2-4 can be created by multiplying each of the first through $m^{th}$ coefficients of the Filter 1 embodiment with the corresponding one of the first though $m^{th}$ values from the respective one of the following repeating sequences:

Filter 2 shift=$e^{jm\ \pi/2}$; coeff. multipliers={1, j, -1, -j, 1, ... }

Filter 3 shift=$e^{jm\pi}$ coeff. multipliers={1, -1, 1, -1, ... }

Filter 4 shift=$e^{j3m\pi/2}$ coeff. multipliers={1, -j, -1, j, ... }

Filters 2, 3, 4, will differ from the original filter, Filter 1, by the sign of some coefficients and whether they are real valued or imaginary. They can be realized from the original filter by simply changing the structure of the filter adder tree through the use of multiplexers to thereby re-configure the filter.

Figure 9:
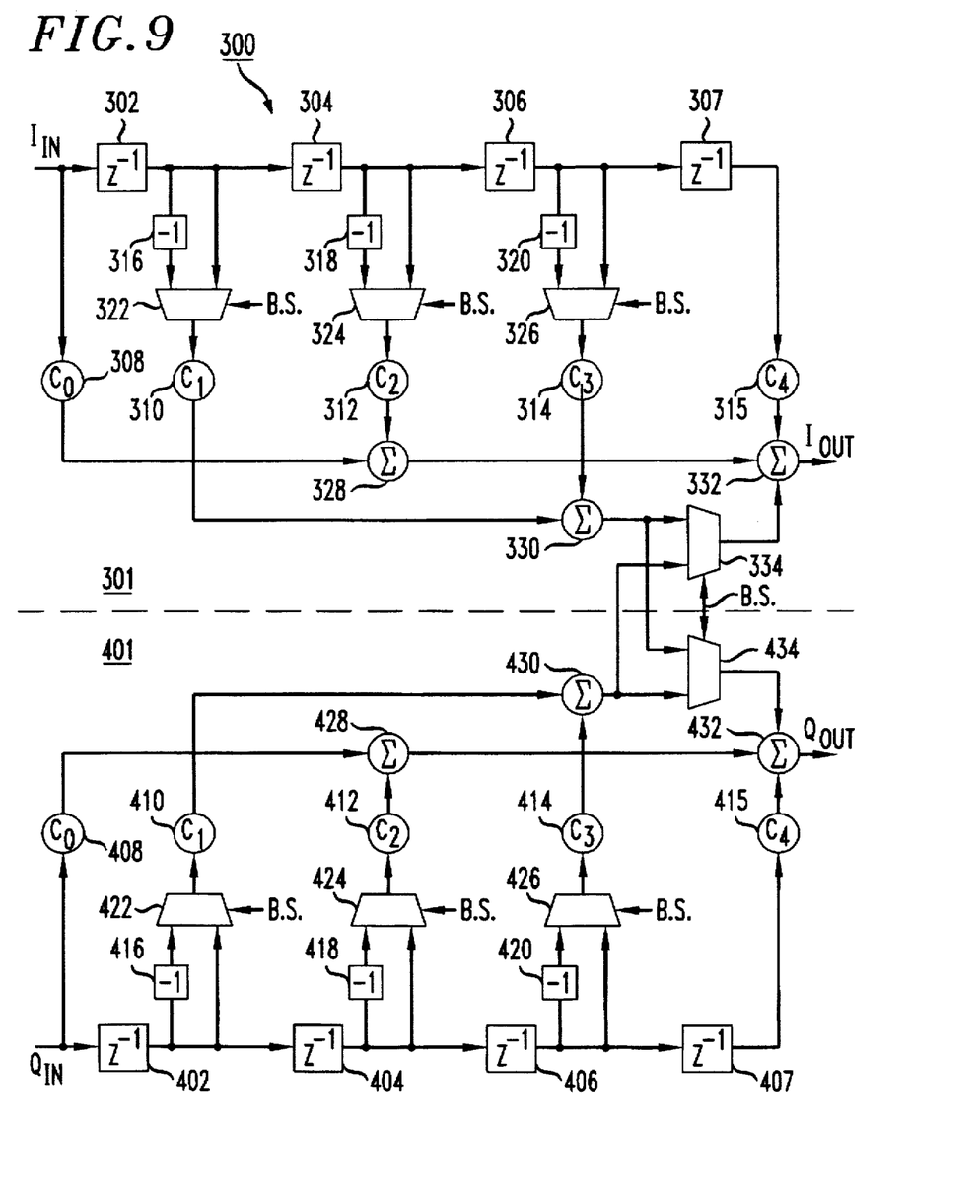
FIG. 9 illustrates an exemplary 4 Tap pass band filter suitable for use in one embodiment of the interpolator of the present invention.

A four tap complex filter 300, which may be used as any one of the L bandpass filters 206, 212, 222, to provide any one of the filter transfer functions illustrated in FIG. 8, is illustrated in FIG. 9. By controlling the value of the filter coefficients via the BS (filter band select) signal, the passband of the filter can be placed at the appropriate location as may be required to implement any of the filters 206, 212, 222.

Because the selection of the required transfer function for a filter can be achieved by the inversion or non-inversion or interpretations of filter coefficients as real or imaginary, the design of the L filters 206, 212, 222 can be treated as the design of a single quarter-band filter. This single filter design can be optimized and simplified as much as possible using, e.g., canonical signed digit (CSD) design.

The filter 300 comprises first and second filter segments 301, 401 which are generally identical but for the fact that the first filter segment 301 is used to process the real portion of the complex signal supplied to the filter 300 and the second filter segment 401 is used to process the imaginary portion of the complex signal.

The first filter segment 301 comprises first through fourth unit delay elements 302, 304, 306, 307, first through third −1 multipliers 316, 318, 320, first through fourth multiplexers 322, 324, 326, 334, first through fifth multipliers 308, 310, 312, 314, 315 and first through third summers 328, 330, 332.

Because of the similarity between the first filter segment 301 and the second filter segment 401, the second filter segment 401 will not be described in detail. However, it should be noted that the second filter segment 401 comprises the same general elements as the first filter segment 301.

Referring once again to filter segment 301 of FIG. 9, it can be seen that real portion of the signal to be filtered is supplied as an input to the first unit delay element 302 and to the first multiplier 308. The first multiplier 308 multiplies the input signal by the first filter coefficient value $C_0$. The output of the first multiplier 308 is supplied to a first input of the first summer 328.

The output of the first unit delay element 302 is coupled to the input of the first −1 multiplier 316, a second input of the first multiplexer 322 and the second unit delay element 304. The first multiplexer 322 receives as inputs the output of the first unit delay element 302, the output of the first −1 multiplier 316, and the BS signal which is used to control which one of the two inputs is supplied to the output of the first multiplexer 322. In the illustrated embodiment the BS signal may be a different two bit control signal for each stage of the interpolation circuit. The output of the first multiplexer 322 is supplied to the input of the second multiplier 310 to be multiplied by the second coefficient $C_1$ prior to being supplied to a first input of the second summer 330.

In a similar fashion, the output of the second unit delay element 304 is coupled to the input of the second −1 multiplier 318, a second input of the second multiplexer 324, and the third unit delay element 306. The second multiplexer 324 receives as inputs the output of the second unit delay element 304, the output of the second −1 multiplier 318, and the B.S. signal which is used to control which one of the two inputs is supplied to the output of the second multiplexer 324. The output of the second multiplexer 324 is supplied to the input of the third multiplier 312 to be multiplied by the third coefficient $C_2$ prior to being supplied to a second input of the first summer 328.

The output of the third unit delay element 306 is coupled to the input of the fourth unit delay element 307, the third −1 multiplier 320, and a second input of the third multiplexer 326. Thus, the third multiplexer 326 receives as inputs the output of the third unit delay element 306, the output of the third −1 multiplier 320, and the BS signal which is used to control which one of the two inputs is supplied to the output of the third multiplexer 326. The output of the third multiplexer 326 is supplied to the input of the fourth multiplier 314 to be multiplied by the fourth coefficient $C_3$ prior to being supplied to a second input of the second summer 330.

The output of the fourth unit delay element 307 is coupled to the input of the fifth multiplier 315. In this manner, the output of the fourth unit delay element 307 is multiplied by the fifth coefficient $C_4$ prior to being supplied to an input of the third summer 332.

The output of the second summer 330 is coupled to a first input of the fourth multiplexer 334 of the first filter segment 301 and to a first input of the fourth multiplexer 434 of the second filter segment 401. A second input of the fourth multiplexer 334 is coupled to the output of the second summer of the second filter segment 401. The BS signal is used to control which one of the two input signals the fourth multiplexer 334 will output to the third summer 332.

The third summer 332 receives and sums the signal generated by the first summer 328, the signal output by the fourth multiplexer 334, and the signal output by the fifth multiplier 315 to generate the real (I) output signal generated by the filter circuit 300.

Figure 10:
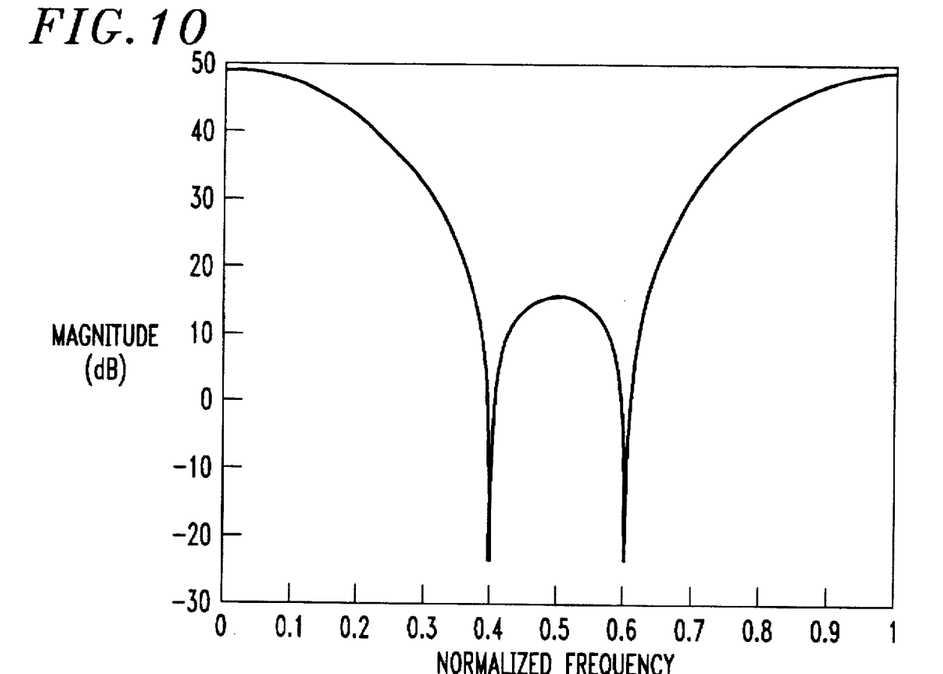
FIGS. 10–13 illustrate the normalized frequency response of passband filters used as part of an interpolation circuit in accordance with one exemplary embodiment of the present invention.

The transfer function for a bandpass four tap filter of the type illustrated in FIG. 9 having coefficient values $C_0$=15, $C_1$=71, $C_2$=106, $C_3$=71, $C_4$=15, is illustrated in FIG. 10. The transfer function for this filter as expressed using Z transforms, is $H(z)=15+71z^{-1}+106z^{-2}+71z^{-3}+15z^{-4}$. Such a bandpass filter is suitable for use as a 2x interpolator filter.

Figure 11:
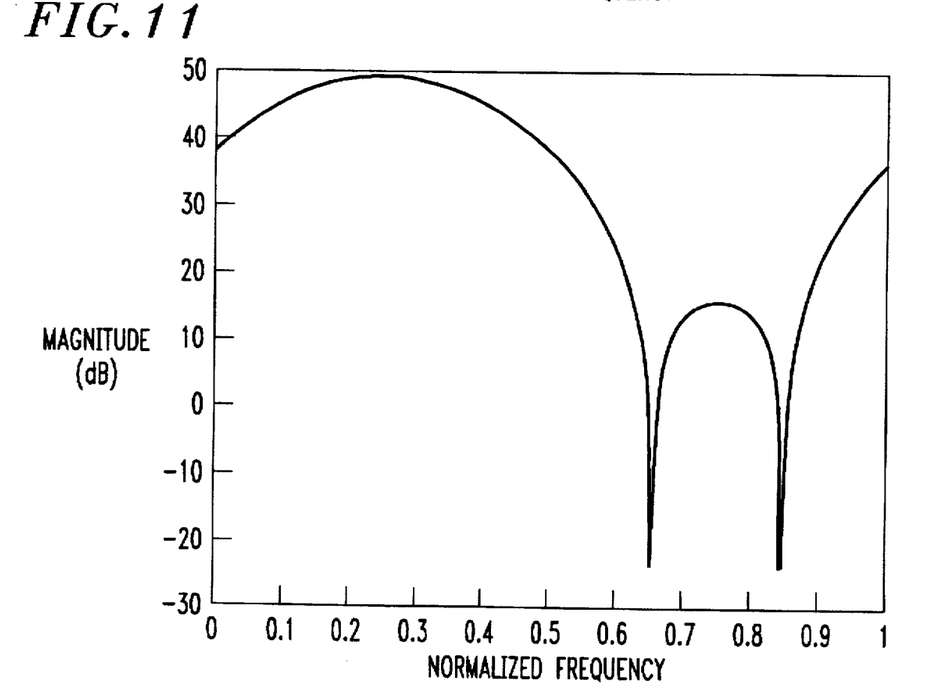

The filter of FIG. 9 may be transformed into a filter having the center of the passband located at $\pi/2$ by merely multiplying the coefficients by the sequence $\{1, j, -1, -j, 1\}$. Such an operation can be performed by controlling the first through fourth multiplexers 322, 422, 324, 424, 326, 426 and 334, 434 of the first and second filter segments 301, 401 through the use of the BS signal. The transfer function $H(z)=15+j71z^{-1}-106z^{-2}-71jz^{-3}+15z^{-4}$ is illustrated in FIG. 11.

Figure 12:
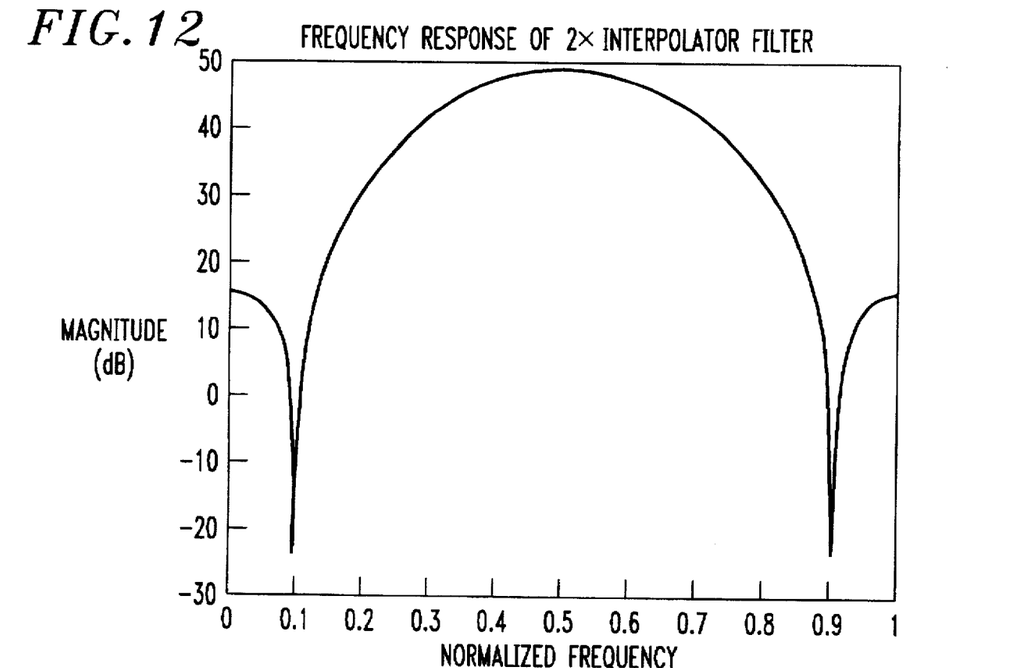

Similarly, the filter of FIG. 9 may be transformed into a filter having the center of the passband located at $\pi$ by merely multiplying the coefficients by the sequence $\{1, -1, 1, -1, 1\}$. Such an operation can be performed by controlling the first through fourth multiplexers 322, 422, 324, 424, 326, 426 and 334, 434 through the use of the B.S. signal. The resulting transfer function $H(z)=15-71z^{-1}+106z^{-2}-71z^{-3}+15z^{-4}$ is illustrated in FIG. 12.

Figure 13:
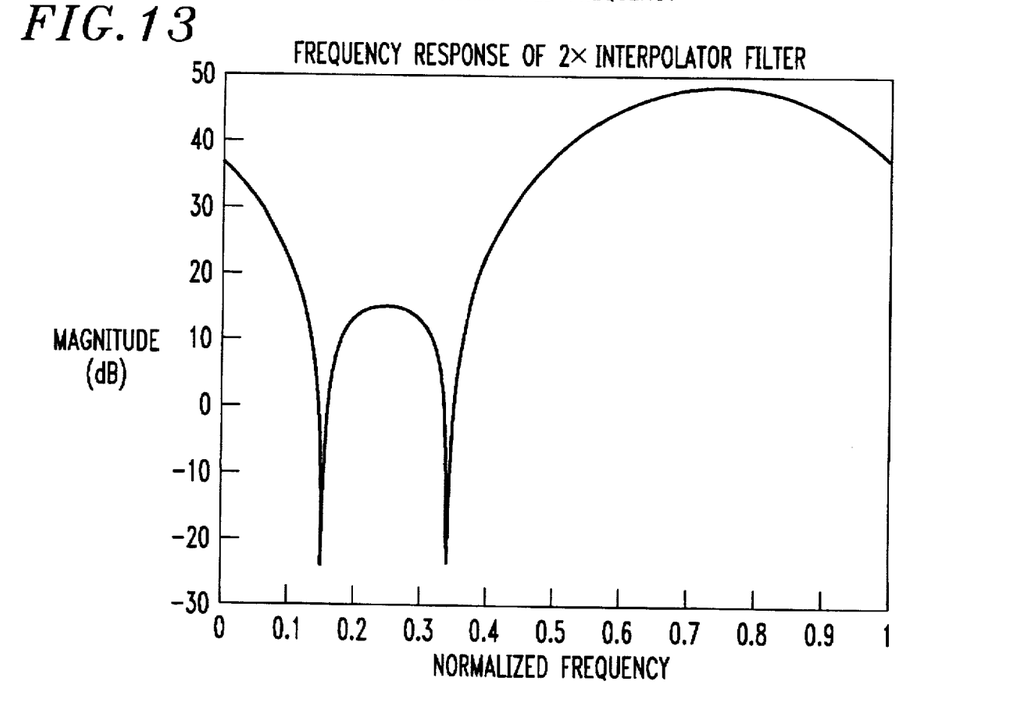

The filter of FIG. 9 may also be transformed into a filter having the center of the passband located at $3\pi/2$ by merely multiplying the coefficients by the sequence $\{1, -j, -1, j, 1\}$. Once again, such an operation can be performed by controlling the first through fourth multiplexers 322, 422, 324, 424, 326, 426 and 334, 434 through the use of the B.S. signal. The resulting transfer function $H(z)=15-71jz^{-1}-106z^{-2}+71jz^{-3}+15z^{-4}$ is illustrated in FIG. 13.

In the above described manner it is possible to use a single filter design to implement the filter circuits 206, 212, 222 of the interpolation circuit 200 with control signals, e.g., the BS signal, being used to determine the transfer function of the individual filters 206, 212, 222.

In the cascaded interpolation stage embodiment of the present invention, e.g., as illustrated in FIG. 6, the output of any interpolation stage 201, 202, 203 can be used as the final interpolation stage. Thus, the cascade interpolator 200 is really a family of interpolator stages 201, 202, 203 with a selectable interpolation ratio. When each interpolation stage 201, 202, 203 is a 2x interpolation stage, the output interpolation ratio can be made selectable. The output interpolation ratio can be any value corresponding to $2^X$ where X is selected to be any value from 1 to L and where L represents the total number of 2x interpolation stages 201, 202, 203.

Figure 14:
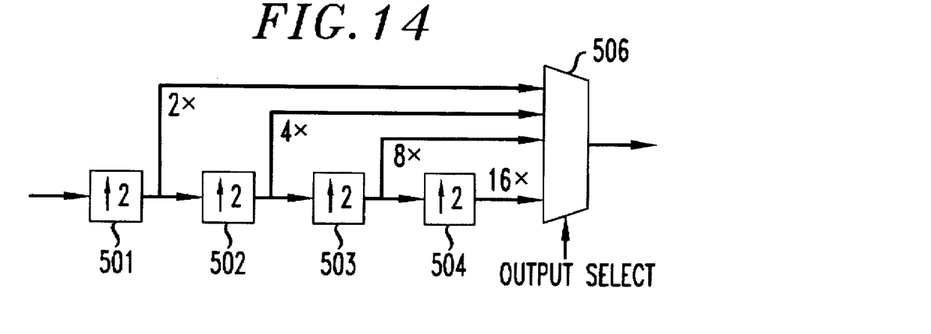
FIGS. 14 and 15 illustrate circuitry suitable for use in implementing interpolation circuits including a series of cascaded interpolation stages, in accordance with various embodiments of the present invention.

Referring now to FIG. 14, there is illustrated a cascade arrangement of four 2x interpolation stages 501, 502, 503, 504 which may be the same as or similar to the stages 201, 202, 203 of FIG. 6. The input to the first 2x interpolation stage 501 is the signal to be interpolated. The output of each 2x interpolation stage, with the exception of the last 2x interpolation stage is coupled to the next 2x interpolation stage and to an input of the multiplexer 506. The output of the last 2x interpolation stage 504 is coupled to the input of the multiplexer 506 but not to an input of another interpolation stage.

The multiplexer 506 is controlled by way of an output select signal supplied thereto. The multiplexer 506 can be used to select the output of any one of the interpolation stages as the output of the cascade arrangement of interpolation stages and to thereby control the overall amount of interpolation. In such an embodiment, it is expected that each interpolation stage 501, 502, 503, 504 will be implemented to operate at a clock rate which is the output clock rate divided by the amount of interpolation between the current stage and the ultimate output. Thus, when the interpolation rate is changed via selecting the output of an interpolation stage 501, 502, 503 which is different from the final interpolation stage 504, the output rate will be reduced to the clock rate of the interpolation stage selected to provide the output signal.

An alternate arrangement for selecting the interpolation ratio is to multiplex the inputs of each interpolation stage to select between the output of the previous stage or the overall interpolator input. Such an embodiment is illustrated in FIG. 15.

Figure 15:
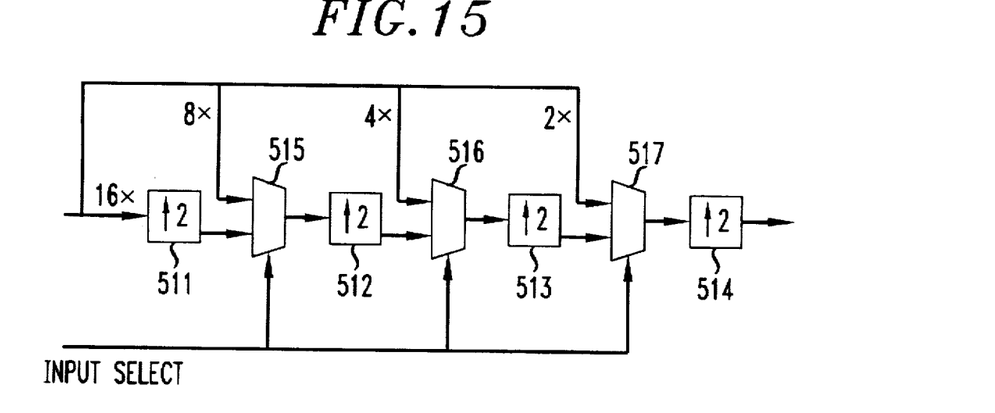

As illustrated in FIG. 15, the input to the first interpolation stage 511 is supplied to a first through third multiplexer 515, 516, 517. The first multiplexer 515 is located between the first interpolation stage 511 and the second interpolation stage 512. The second multiplexer 516 is located between the second and third interpolation stages 512, 513 and the third multiplexer 517 is located between the third and fourth interpolation stages 513, 514. By supplying an input control signal to the multiplexers 515, 516, 517, the inputs to each stage can be controlled to be either the input to the first interpolation stage or to be the output from the previous interpolation stage.

The FIG. 15 embodiment has the advantage of allowing the input rate of the interpolator to be increased and the interpolation rate decreased with the output clock rate being maintained at the design maximum.

It should be noted that the inputs and outputs of the interpolation stages in the embodiments of FIGS. 14 and 15 can be complex signals.

As discussed above, FIG. 8 shows the frequency response of quarter band filters used in one embodiment of the present invention. One method for selecting one of a number of possible quarter band filter transfer functions for removing image signals during the upsampling process is to use a filter 300 whose taps are configurable as has been described above.

Figure 16:
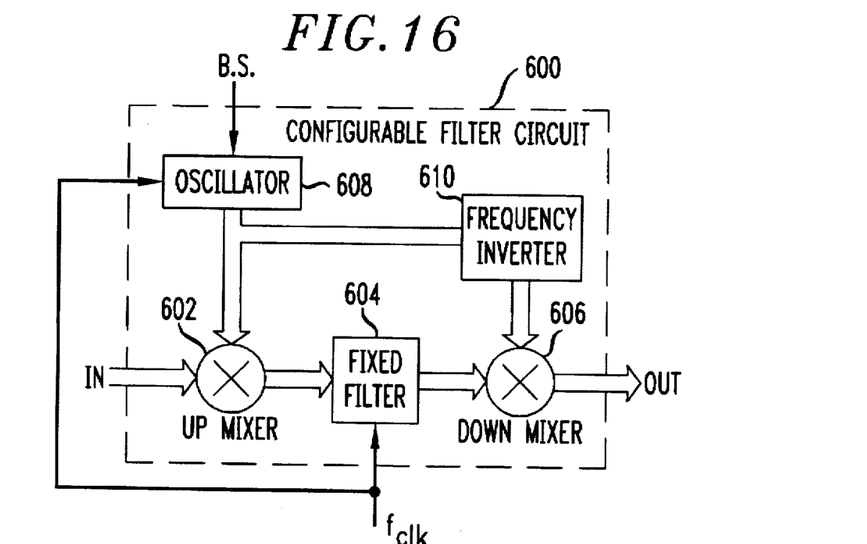
FIG. 16 illustrates a configurable filter circuit implemented in accordance with various exemplary embodiments of the present invention.

Another method for selecting a particular filter configuration is by using a fixed filter and then shifting the frequency of the signal that is supplied to, and then output from, the fixed filter. Such an embodiment is illustrated in FIG. 16. As illustrated in FIG. 16, the configurable filter circuit 600 comprises a first mixer 602, a fixed filter 604, a second mixer 606, an oscillator 608 and a frequency inverter circuit 610. For purposes of explanation the first mixer 602 will be referred to as an up mixer since it introduces a frequency shift into the signal supplied to the configurable filter circuit 600. The configurable filter circuit 600 also receives as an input signal, the band select signal. This signal is used to control the oscillator 608 which generates, as a function of the BS (band select) signal, a complex output signal. The oscillator's complex output signal is used, by the up mixer 602 to shift the frequency of the input signal before the filtering operation is performed. In addition, the oscillator's complex output signal is supplied to the frequency inverter circuit 610. The frequency inverter circuit 610 generates the inverse frequency of the complex oscillator output signal. That is, it reverses the rotational sense of the complex signal, e.g., by swapping the real and imaginary components of the complex oscillator output signal or by, e.g., taking the complex conjugate of the complex oscillator output signal. For exemplary purposes the frequency inverter 610 will be discussed in terms of a complex conjugate embodiment which generates the conjugate of the complex oscillator output signal.

The generated conjugate of the complex oscillator output signal is supplied to an input of the down mixer 606. The down mixer 606 also receives the output of the fixed filter 604. The down mixer 606 effectively reverses the frequency shift introduced into the carrier signal by the up mixer 602. By shifting the carrier signal's frequency in response to a control signal, filtering the signal, and then reversing the frequency shift, the ability to change the transfer function of the configurable filter circuit 600 is achieved despite the use of the fixed filter 604.

The fixed filter 604 may be implemented, e.g., as a single low pass filter having real filter coefficients to achieve a filter transfer function which is the same as, or similar to, the one represented by the use of a solid line in FIG. 8. The fixed filter 604 can be implemented as two independent filters acting separately upon (I) in-phase and (Q) quadrature phase signal components. In such an embodiment, each of the I and Q filters will have real coefficients and will process real data.

In one embodiment, at the input of the fixed filter 604, the input signal is shifted in frequency, using the up mixer 602, by 0, $\pi/2$, $\pi$, or $3\pi/2$ radians, with the filter sampling rate fclk representing $2\pi$ radians. The signal output by the fixed filter 604 is then shifted in frequency in the opposite direction by the down mixer 606 such that there is no net frequency shifting between the input and output of the configurable filter circuit 600.

An advantage of this method of implementing a configurable filter circuit 600 is that it requires that the frequency shifting operations be performed only at the input and output of the fixed filter 604 regardless of the number of taps in the filter 604, i.e., the filter coefficients of multiple taps need not be changed.

It should be noted that embodiments of the type illustrated in FIG. 16 are particularly easy to implement where the frequency shifting is limited to 0, $\pi/2$, $\pi$, or $3\pi/2$ radians per sample, since this involves rotations at each sample of 0, $\pi/2$, $\pi$, or $3\pi/2$ radians, which can be achieved using combinations of multiplexers and inverters.

A discussion of additional circuits suitable for implementing various features of the present invention as well as control circuits which may be used to control the various stages of an interpolation circuit implemented in accordance with the present can be found in U.S. patent application Ser. No. 08/784,437, titled "METHODS AND APPARATUS FOR IMPLEMENTING AND CONTROLLING A DIGITAL MODULATOR" filed on even date herewith and assigned to the same assignee as the present patent application, which is hereby expressly incorporated by reference.

While the padding and filter operations performed at each stage of the interpolation process are illustrated herein as being implemented using separate padding and filtering circuits, it is to be understood that these operations may be performed by a single device capable of achieving the padding operation as part of the filtering process.

What is claimed is:

1. An apparatus for processing digital data representing an information signal having a first sampling frequency, to produce a signal having a sampling frequency which is higher than the first sampling frequency, the apparatus comprising:

an interpolation circuit including:
  a first interpolation stage, the first interpolation stage including:
    i. a first signal padding circuit which generates a first padded signal from the information signal, the padded signal having a second sampling frequency that is a multiple of the first sampling frequency and including a representation of the information signal and an information signal image; and
    ii. a first filter for generating a first filtered signal by passing the representation of the information signal image and removing the representation of the information signal.

2. The apparatus of claim 1,
wherein the first padded signal includes representations of a plurality of information signal images;
wherein the first filter is a configurable filter; and
wherein the apparatus further comprises:
  means for changing the transfer function of the first filter to control the removal of representations of information signal images from the first padded signal.

3. The apparatus of claim 1, wherein the interpolation circuit comprises:
a second interpolation stage, coupled to the first filter, the second interpolation stage including:
  i. a second signal padding circuit which generates from the first filtered signal, a second padded signal having a third sampling frequency which is higher than the second sampling frequency, the second filtered signal including the subset of information signal components passed by the first filter; and
  ii. a second filter having a transfer function which passes at least one of the information signal components and rejects at least one of the information signal components included in the second padded signal.

4. An apparatus for converting a first signal having a first sampling rate to a signal having a higher sampling rate, comprising:

an interpolation circuit including:
  a first signal padding circuit for performing a padding operation on the first signal to generate a first padded signal having a higher sampling rate than the first signal;
  a first configurable filter coupled to the first signal padding circuit for performing a filtering operation on the first padded signal to generate a first filtered signal; and means for controlling the transfer function of the first configurable filter.

5. The apparatus of claim 4,
wherein the first signal has a first carrier frequency; and
wherein the means for controlling the transfer function of the first configurable filter controls said transfer function such that the first filtered signal has a second carrier frequency which is different from said first carrier frequency.

6. The apparatus of claim 4, wherein the interpolation circuit further comprises:
a second signal padding circuit coupled to the first configurable filter for performing a padding operation on the first filtered signal to generate a second padded signal having a higher sampling rate than the first filtered signal; and
a second configurable filter coupled to the second signal padding circuit for performing a filtering operation on the second padded signal.

7. The apparatus of claim 6, wherein the interpolation circuit further comprises:
a third signal padding circuit coupled to the second configurable filter for performing a padding operation on the second filtered signal to generate a third padded signal having a higher sampling rate than the second filtered signal; and
a third configurable filter coupled to the third padding circuit for performing a filtering operation on the third padded signal.

13

8. The apparatus of claim 7, further comprising:
means for changing the transfer function of the second and third configurable filters.

9. The apparatus of claim 4,
wherein the first signal is a digital signal;
wherein the first configurable filter is a complex digital filter; and
wherein the means for changing the transfer function of the first configurable filter includes multiplexers used to change filter coefficient values.

10. The apparatus of claim 4, further comprising:
an oscillator for outputting a carrier signal having an oscillator frequency which is a fraction of the sampling frequency of the first filtered signal; and
a digital mixer, having an input coupled to the oscillator and an output coupled to the interpolator circuit, the mixer receiving the first signal and mixing it with the signal output by the oscillator.

11. An apparatus for processing a digital information signal having a first sampling frequency, the apparatus comprising:
an interpolation circuit including:
i. a first interpolation stage including means for performing a first padding and filtering operation on the information signal to generate therefrom a first padded and filtered signal by passing a representation of an information signal image generated as a function of the first padding operation while rejecting a representation of the information signal; and
ii. a second interpolation stage including means for performing a second padding and filtering operation on the first padded and filtered signal to generate an output signal, the output signal having a sampling frequency which is higher than the first sampling frequency and including an information signal image generated as a result of one of the first or second padding operations.

12. A method of processing an input signal including a first plurality of samples and having a first sampling frequency, comprising the steps of:
performing a first interpolation operation, the first interpolation operation including the steps of:
i. padding the input signal to increase the sampling frequency by a multiple of M where M is a positive integer greater than 1, the padding operation including the step of inserting at least one additional sample between the samples included in the input signal to produce a first padded signal including a signal image; and
ii. filtering the first padded signal produced by the padding operation using a first passband filter to remove at least one signal image from the first padded signal to thereby produce a first filtered signal; and
performing a second interpolation operation, the second interpolation operation including the steps of:
i. padding the first filtered signal to increase the sampling frequency of the first filtered signal by a multiple of N, where N is a positive integer greater than 1, the padding operating including the step of inserting at least one additional sample between the

14 information signal components of the first filtered signal to produce a second padded signal including another signal image; and
ii. filtering the second padded signal produced by the padding operation using a second passband filter to remove at least another signal image from the first padded signal to thereby produce a second filtered signal having a sampling frequency that is higher than the first sampling frequency.

13. The method of claim 12, wherein the transfer function of the first and second passband filters used in the filtering steps can be selected from a plurality of possible transfer functions, the method further comprising the step of:
supplying a transfer function control signal to the first and second passband filters to control the transfer function of the first and second passband filters.

14. The method of claim 13, wherein each of the first and second passband filters have a plurality of filter coefficient values and wherein the method further comprises the step of:
changing the sign of at least one of the filter coefficient values of the first and second passband filters in response to the transfer function control signal.

15. The method of claim 14, further comprising the step of:
supplying the first and second filtered signals to an interpolation output control device; and
operating the interpolation output control device to selectively output one of the first and second filtered signals.

16. The method of claim 12, further comprising the step of:
supplying the first and second filtered signals to an interpolation output control device; and
operating the interpolation output control device to selectively output one of the first and second filtered signals.

17. A modulator comprising:
a digital pulse shaping circuit for performing a pulse shaping operation on an information signal having a first sampling rate;
a digital mixer coupled to the digital pulse shaping circuit for modulating the information signal on a first carrier signal; and
digital interpolating means coupled to the digital mixer for performing at least one interpolation operation on the signal output by the mixer to produce an output signal having a sampling rate that is higher than the first sampling rate.

18. The modulator of claim 17, further comprising:
an oscillator coupled to the digital mixer for supplying the mixer with a digital mixing signal having a frequency lower than the first sampling rate.

19. The modulator of claim 17,
wherein the first carrier signal has a first carrier frequency; and
wherein the output signal includes a second carrier signal having a carrier frequency which is different from the first carrier frequency.

20. The modulator of claim 17, wherein the digital interpolating means includes:
a plurality of L interpolation stages coupled together in series, each interpolation stage including a padding circuit and a filter, where L is a positive integer.

21. The modulator of claim 20, wherein at least one of the L interpolation stages includes:
filter transfer function control circuitry for controlling at least one filter coefficient value in response to a filter coefficient control signal.

22. The modulator of claim 20, wherein the digital interpolating means further comprises:

an input control device having a first input coupled to the mixer, a second input coupled to an output of a first one of the L interpolation stages, and an output coupled to an input of a second one of the L interpolation stages, the input control device selectively supplying the output of the first interpolation stage or the output of the mixer to the input of the second interpolation stage.

23. The modulator of claim 20, wherein the digital interpolating means further comprises:

a digital to analog converter; and an output control device coupled to an output of each one of the L interpolation stages and to the digital to analog converter, the output control device supplying the output of one of the interpolation stages to the digital to analog converter.

* * * * *